United States Patent
Natori

(10) Patent No.: US 8,537,388 B2
(45) Date of Patent: Sep. 17, 2013

(54) INFORMATION PROCESSING APPARATUS FOR IMAGE PROCESSING ON A CHARACTER STAMP BY EMBEDDING AN IMAGE RENDERING A CHARACTER STRING OF A STAMP

(75) Inventor: Hideo Natori, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 937 days.

(21) Appl. No.: 12/422,112

(22) Filed: Apr. 10, 2009

(65) Prior Publication Data

US 2009/0284786 A1 Nov. 19, 2009

(30) Foreign Application Priority Data

May 13, 2008 (JP) ................................. 2008-125879

(51) Int. Cl.
*G06F 3/12* (2006.01)
(52) U.S. Cl.
USPC ........... 358/1.15; 358/1.9; 358/2.1; 358/1.11; 347/467; 347/471

(58) Field of Classification Search
USPC .................................................. 358/1.1–3.23
See application file for complete search history.

(56) References Cited

U.S. PATENT DOCUMENTS

| | | | |
|---|---|---|---|
| 2002/0175958 A1 | 11/2002 | Natori | |
| 2003/0002063 A1 | 1/2003 | Oomura | |
| 2005/0080839 A1* | 4/2005 | Kuwata et al. | 709/200 |
| 2005/0105118 A1* | 5/2005 | Yoshida | 358/1.13 |

FOREIGN PATENT DOCUMENTS

| | | |
|---|---|---|
| JP | 2005-63052 A | 3/2005 |
| JP | 3897539 B2 | 3/2007 |
| JP | 3962559 B2 | 8/2007 |

* cited by examiner

*Primary Examiner* — Benny Q Tieu
*Assistant Examiner* — Marcellus Augustin
(74) *Attorney, Agent, or Firm* — Canon USA Inc. IP Division

(57) ABSTRACT

In an information processing apparatus which can edit print data capable of including an image resource, provided is a method which performs suitable image processing on a character stamp image by embedding an image rendering a character string of a stamp and attaching information for distinguishing the embedded image.

14 Claims, 12 Drawing Sheets

FIG.11A

```
<?xml version="1.0" encoding="utf-8"?>
<FixedPage Width="793.70081" Height="1122.51965" xml:lang="en-US"
   xmlns="http://schemas.microsoft.com/xps/2005/06">
   <Canvas RenderTransform="1,0,0,1,0,0">
     Clip="M 12.66142,11.14961 L 781.03937,11.14961 L 781.03937,1103.81104 L 12.66142,1103.81104 Z"
   <Canvas RenderTransform="1,0,0,1,12.8,11.2">
1101 — <!-- RENDERING DATA OF FIRST PAGE OF DOCUMENT (OMITTED) -->
     </Canvas>
     <Canvas RenderTransform="1,0,0,1,704.31494,11.33858">
       <Path Data="M 5.55591,13.26614 L 70.97953,13.26614 70.97953,67.16220 5.55591,67.16220 z">
         <Path.Fill>
           <ImageBrush
             ImageSource="/WM_00069423.png"
1103 —       TextStamp="true"
             viewbox="0,0,65.440002,53.919998"
             viewport="5.55591,13.26614,65.42362,53.89606"
             viewboxUnits="Absolute"
             viewportUnits="Absolute"
             TileMode="None"/>
         </path.Fill>
       </Path>
     </Canvas>
   </Canvas>
</FixedPage>
```

FIG.11B

```
<?xml version="1.0" encoding="utf-8"?>
<FixedPage Width="793.70081" Height="1122.51965" xml:lang="en-US"
   xmlns="http://schemas.microsoft.com/xps/2005/06">
   <Canvas RenderTransform="1,0,0,1,0,0">
     Clip="M 12.66142,11.14961 L 781.03937,11.14961 L 781.03937,1103.81104 L 12.66142,1103.81104 Z"
   <Canvas RenderTransform="1,0,0,1,12.8,11.2">
1105 — <!-- RENDERING DATA OF SECOND PAGE OF DOCUMENT (OMITTED) -->
     </Canvas>
     <Canvas RenderTransform="1,0,0,1,704.31494,11.33858">
       <Path Data="M 5.55591,13.26614 L 70.97953,13.26614 70.97953,67.16220 5.55591,67.16220 z">
         <Path.Fill>
           <ImageBrush
             ImageSource="/WM_00069423.png"
1107 —       TextStamp="true"
             viewbox="0,0,65.440002,53.919998"
             viewport="5.55591,13.26614,65.42362,53.89606"
             viewboxUnits="Absolute"
             viewportUnits="Absolute"
             TileMode="None"/>
         </path.Fill>
       </Path>
     </Canvas>
   </Canvas>
</FixedPage>
```

INFORMATION PROCESSING APPARATUS FOR IMAGE PROCESSING ON A CHARACTER STAMP BY EMBEDDING AN IMAGE RENDERING A CHARACTER STRING OF A STAMP

BACKGROUND OF THE INVENTION

1. Field of the Invention

The present invention relates to an information processing apparatus which performs processing using a font, an information processing method, and a storage medium, when printing a document created by an application.

2. Description of the Related Art

When performing printing which includes print data for information transmission and print data for function display, for example, when distributing a document which is marked "confidential", a stamp expressing the characters "confidential" can be put on each page of a document. However, manually putting a stamp on each page of a printed material after printing is costly. Therefore, such printing is generally performed by printing an electronic mark such as "confidential" along with the document. The mark such as "confidential" is referred to as a "stamp".

To print a document with a stamp, an application has to include an input portion for receiving a character string of the stamp desired by the user, the font used for rendering the character string of the stamp and the like. Further, when printing the document, the application has to superimpose the stamp designated by the user on each page of the document, and issue a rendering command of the superimposition results. Namely, each time the stamp to be superimposed on the document is changed, the document itself has to be edited. To improve on such time and effort, there is a method for realizing the stamp function by a printer driver.

The rendering command issued by the application is stored in a spool file as print data. Namely, the spool file is an electronic document format which does not depend on the application. The printer driver has a function of converting the print data stored in the spool file into a print command which can be interpreted by a printer, and supplying the print command to the printer. To realize the stamp function by the printer driver, the character string of the stamp is superimposed on each page of the print data. FIG. 4 illustrates a concept of the superimposition results of print data and the characters to be superimposed in stamp processing. The contents of page 401 in FIG. 4A are created by the application and spooled as print data. Characters 402 in FIG. 4B are a stamp which is superimposed on the print data of each page of the document. Page 403 in FIG. 4C is a page illustrating the results of superimposing the characters 402 of the stamp on the page 401 spooled as print data.

Three methods are known as a method for superimposing characters with a font designated by the user on the print data by the printer driver. They are font embedding, image embedding, and character code embedding. Each of these methods will now be described.

Font embedding is a method in which font form information is embedded into the print data along with a character rendering command by editing the print data with the printer driver. The font form information embedded into the print data is used for rendering the superimposed characters when generating the print command. Thus, this method has the advantage that the output intended by the user can be obtained even if the designated font is not present in the environment for generating the print command. However, because the font form information is embedded in the print data, the print data amount tends to increase. This problem cannot be overlooked especially when embedding fonts which have a large number of character types, such as Japanese fonts.

Image embedding is a method in which an image rendering command is embedded into the print data along with the image rendering the characters by editing the print data with the printer driver. Thus, in this method, the characters are output in the font intended by the user even if the font designated by the user is not present in the environment for generating the print command. However, since the characters are formed as an image, if the image is expanded when generating the print command, the quality of the characters can deteriorate.

Character code embedding is a method in which the character rendering command and a font attribute are embedded into the print data along with a character code which does not depend on the font, by editing the print data with the printer driver. If the font designated by the user is present in the environment for generating the print command, the output intended by the user can be obtained. Further, if the font designated by the user is not present in the environment for generating the print command, rendering using a different font is performed, which is generally called "font replacement". Even when this font replacement is performed, there is still the advantage that garbled characters and the like are not produced, although the font is different from that designated by the user.

From among these methods for superimposing characters with a font designated by the user on the print data, a suitable method can be selected based on the kind of printer driver or operating system (OS), and on the printer performance and the like. As an example of font embedding processing, a technique has been discussed in which a user interface module of the printer driver inserts on behalf of the application a page on which characters are rendered (see Japanese Patent No. 03897539, for example). Further, a technique has also been discussed where, if an embedded font is included, the embedded font is acquired, and the acquired embedded font is stored along with intermediate data (see Japanese Patent No. 03962559, for example). In addition, another discussed technique is to switch between performing font embedding processing or image embedding processing when expressing the characters in the electronic document (see Japanese Patent Application Laid-Open No. 2005-63052, for example).

While there are various kinds of printer drivers, here the printer driver called "XPS Printer Driver", which operates using the Windows® OS from Microsoft Corporation, will be described. One of the characteristics of the XPS printer driver is that the format of the device-independent print data stored in the spool file is the same as that of the XPS document data.

The term "XPS" is an acronym for "XML Paper Specification", and is an open standard electronic document format proposed by Microsoft Corporation. An XPS document has a tree structure with a Fixed Document Sequence (FDS) as its root. The FDS has a plurality of Fixed Documents (FDs), and the FDs have a plurality of Fixed Pages (FPs). The FDS, the FDs, and the FPs may respectively be referred to as "XPS parts". The FPs write the page contents of the document in an XML language called Extensible Application Markup Language (XAML), and include a rendering command which is actually used during a display or printing process. Resources such as the fonts and images which are used in FP rendering can be shared among a plurality of FPs. Further, the FDS, FDs, and FPs may respectively have their print settings in a Print Ticket (PT) The PTs describe the print settings when printing the XPS document in XML format. Here, the print settings used when printing each FP are a merged PT of the FDS PT, the PT of the parent FD of the printing object FP, and the PT of the printing object FP.

FIG. 5 is an example of a block diagram illustrating a logic structure of an XPS document. The logic structure of an XPS document 501 has a tree structure whose root node is the FDS 503. The FDS 503 has an FD 511 and an FD 513 as children. The FD 511 has an FP 521 and an FP 523 as children. The FD 513 has an FP 525 as a child. With regard to the PTs in which the print settings are written, the FDS 503 holds a PT 531, the FD 511 holds a PT 533, the FP 521 holds a PT 535, and the FD 513 holds a PT 537, respectively. The FP 523 and the FP 525 do not hold a PT. Further, the FP 521 and the FP 523 share a resource 541, such as a font or an image. The FP 525 utilizes a resource 543, such as a font or an image. Here, for example, the PT used when printing the FP 521 is a PT which merges the PT 531, PT 533, and PT 535. Thus, a characteristic of XPS is that it includes the resources which are necessary for display and printing.

FIG. 2 is an example of a block diagram for illustrating a data flow when an XPS printer driver is operating during printing by an application. In FIG. 2, modules configuring the XPS printer driver include a user interface module 217, a layout filter 213, and a render filter 215.

By calling up from an application 201 the user interface module 217 via a printing support function 203 of the OS, the various settings relating to printing can be performed by the user.

If a printing instruction is produced by a user operation from the application 201, the contents of that instruction are sent to the printing support function 203 of the OS. Specifically, a device context (DC), which is a virtual printing region, is created by a graphic device interface (GDI), which is a rendering engine of the OS, and the DC is supplied to the application 201. Then, rendering processing is performed on the DC for each page of the document by the application 201. The rendering contents are converted into XPS format by Microsoft XPS Document Converter (MXDC), whereby XPS format print data is generated. The XPS format print data is temporarily spooled in a storage apparatus as a spool file 205 for each print job by the printing support function 203 of the OS.

In the above description, it was assumed that the application 201 performs the rendering in the GDI. However, if the application is capable of creating the XPS format electronic document, the created XPS format print data can be spooled without relying on the GDI and the MXDC.

The data stored in the spool file 205 is supplied to a filter pipeline 211 called up by a printing pipeline service 207 of the OS. The filter pipeline 211 is configured by an arbitrary number of filters which are written in a printer driver pipeline configuration file (not illustrated). If the print command which can be interpreted by the printing apparatus 120 is not in XPS format, at least a filter for converting the spooled XPS format data into a print command is necessary. In FIG. 2, the filter pipeline 211 is configured by the layout filter 213 and the render filter 215. The layout filter 213 acquires XPS format print data from the spool file 205, edits the print data as necessary based on the print settings, and outputs the edited print data. For example, if a stamp is designated in the print settings, the layout filter 213 can embed the command for rendering the stamp in the print data with the resource, such as the font or image.

If there is no need for processing the print data, the acquired print data is output as is. The output of the layout filter 213 is supplied to the render filter 215. The render filter 215 performs the rendering processing on each page of the supplied XPS format print data, performs the necessary image processing, converts the resultant data into the print command, and outputs the print command. The print command output by the render filter 215 is supplied to the printing apparatus 120, and the printing apparatus 120 executes the printing operation.

However, when realizing the stamp function in the XPS printer driver, there are the following problems.

First, in the conventional font embedding method, when a font which is prohibited from being embedded into the electronic document is designated as a stamp of the print setting, there is the problem that the layout filter 213 cannot embed the font in XPS format print data. Conversely, the user interface module 217 can be created, which prevents the stamp of the print settings from designating a font that is prohibited from being embedded. However, there is the problem that the number of font options is decreased.

Next, in the conventional image embedding method, when the layout filter 213 embeds an image rendering the characters of the stamp in the XPS print data, there is the problem that the stamp, which supposedly is meant to be processed as a character, is processed as a common image. When the render filter 215 generates the print command from the supplied XPS format print data, the character stamp is an image. Thus, the color processing and halftone processing which should be applied on to characters are not applied, and processing other than that for images, such as for graphics or photographs, is applied. Therefore, there is the problem that the quality of the character portion of the stamp in the print results deteriorates.

Finally, in the conventional character code embedding method, when the layout filter 213 embeds the character code of the stamp in the XPS print data, the font is not embedded in the XPS format print data. More specifically, when rendering the XPS print data, there is the problem that print data which lacks the necessary font resources is supplied to the render filter 215.

SUMMARY OF THE INVENTION

Thus, the present invention is directed to providing an environment in which a font prohibited from being embedded can be designated by the user, and to providing an information processing apparatus in which the quality of the characters in the print results does not deteriorate.

According to one aspect of the present invention, an information processing apparatus includes a determination unit configured to determine whether a designated font is prohibited from being embedded, an embedding unit configured to, when it is determined by the determination unit that the designated font is not a font which is prohibited from being embedded, embed the font as a font resource in document data, and when it is determined by the determination unit that the designated font is a font which is prohibited from being embedded, embed the font as an image resource containing information representing that the font is a character in the document data, and an image processing unit configured to perform character image processing on an image resource containing information representing that the font is a character, and perform image processing on an image resource not containing information representing that the font is a character.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is an example of an XAML to which character text image information is attached.

DETAILED DESCRIPTION OF THE EMBODIMENTS

Various exemplary embodiments, features, and aspects of the invention will be described in detail below with reference to the drawings.

Not all of the combinations of the characteristics described in the present exemplary embodiments are essential to resolve the problems which the present invention is directed to resolving.

First, the configuration of a printer driver of a first exemplary embodiment will be described using FIG. 2.

Figure 2:
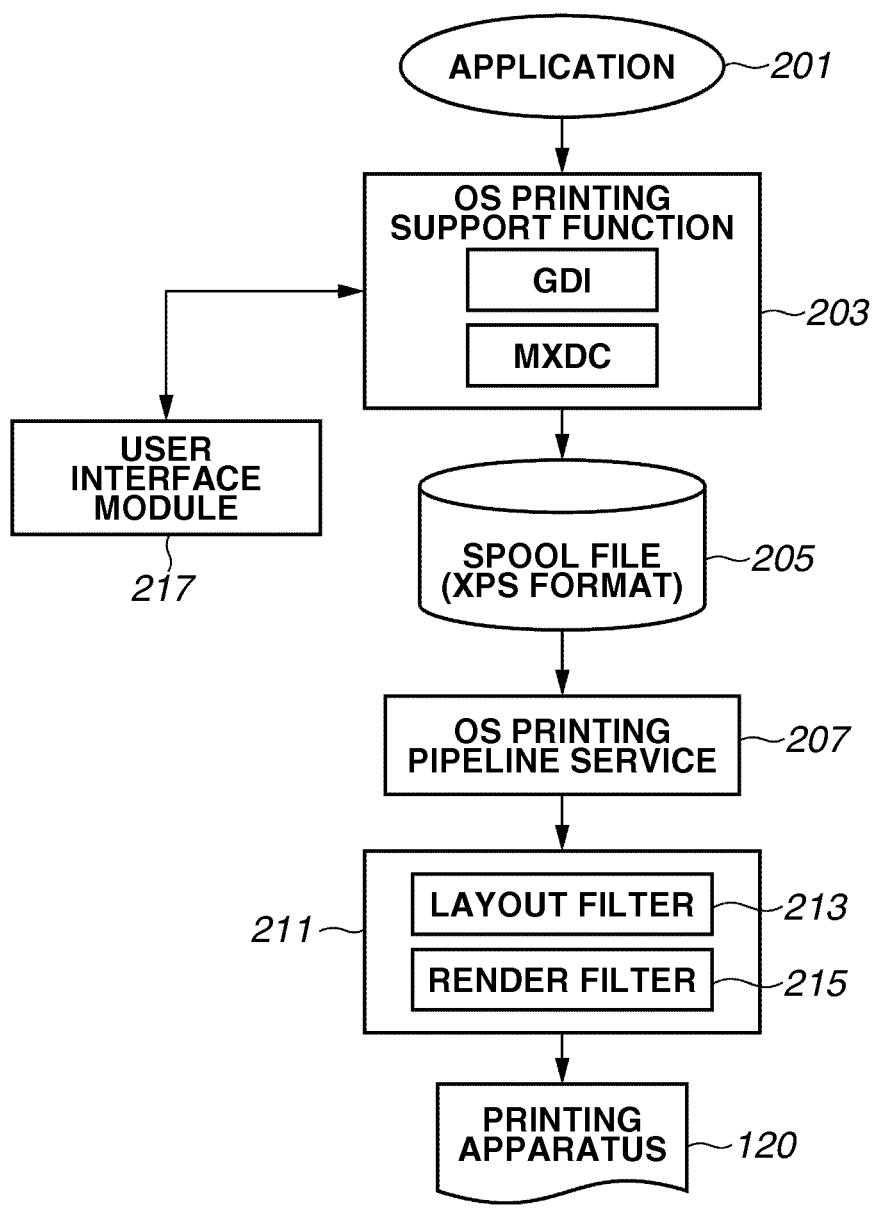
FIG. 2 is an example of a flow of data relating to an XPS printer driver.

FIG. 2 is an example of a block diagram for illustrating a flow of data when an XPS printer driver is operating during printing by an application. Here, the modules configuring the XPS printer driver of the present exemplary embodiment are the user interface module 217, the layout filter 213, and the render filter 215.

The user can perform various settings relating to printing via a print settings dialog provided by the user interface module 217. The print settings dialog relating to the stamp will be described later using FIG. 3. The user can also perform the settings relating to the stamp via the print settings dialog. For example, the character string used in the stamp, the font, the character size and the like can be set. When the application 201 starts the printing processing based on an instruction from the user, the various setting values containing the settings relating to the stamp are stored in the spool file 205 as a PT. A case will now be described in which the stamp in the print setting is set to ON and a font which is prohibited from being embedded into the electronic document is designated for the stamp font.

The data stored in the spool file 205 is initially supplied to the layout filter 213 which is called up by the printing pipeline service 207 of the OS. The layout filter 213 reads the PT from the spool file 205, and checks whether the stamp in the print settings is set to ON. Here, since the stamp is set to ON, the layout filter 213 performs processing to attach the stamp character string to each page of the spooled print data. Since the processing of the layout filter 213 will be described later in more detail using FIG. 6, here only a basic outline of the operation will be given. Since the font set in the stamp is prohibited from being embedded, the layout filter 213 does not embed the font, and embeds a rendered image of the characters of the stamp in the print data (same format as the XPS document data). At this stage, a mark, which is a character stamp image, is attached to the rendered image of the characters of the stamp. Further, a command for rendering the embedded character stamp image is added to the tail of the rendering command of the print data pages, and the resulting command is output. The print data output by the layout filter 213 is supplied to the render filter 215, which is the next filter.

The render filter 215 renders each page of the supplied print data, generates bitmap data, and performs suitable image processing on the respective regions, such as graphics, photographs, characters and the like. Then, the render filter 215 converts the regions which have undergone image processing into a print control command which can be interpreted by the printing apparatus 120, and outputs the converted print control command. At this stage, although the stamp characters are embedded as an image, since the mark of the character stamp image is attached, image processing for characters is performed on the character regions. The determination processing of the character stamp image performed by the render filter 215 will be described in more detail below using FIG. 7. Further, the switching of the image processing by the render filter 215 with respect to the character stamp image will be described below using FIG. 12. The printing apparatus 120 receives the print command, and forms an image on the printing medium.

Figure 1:
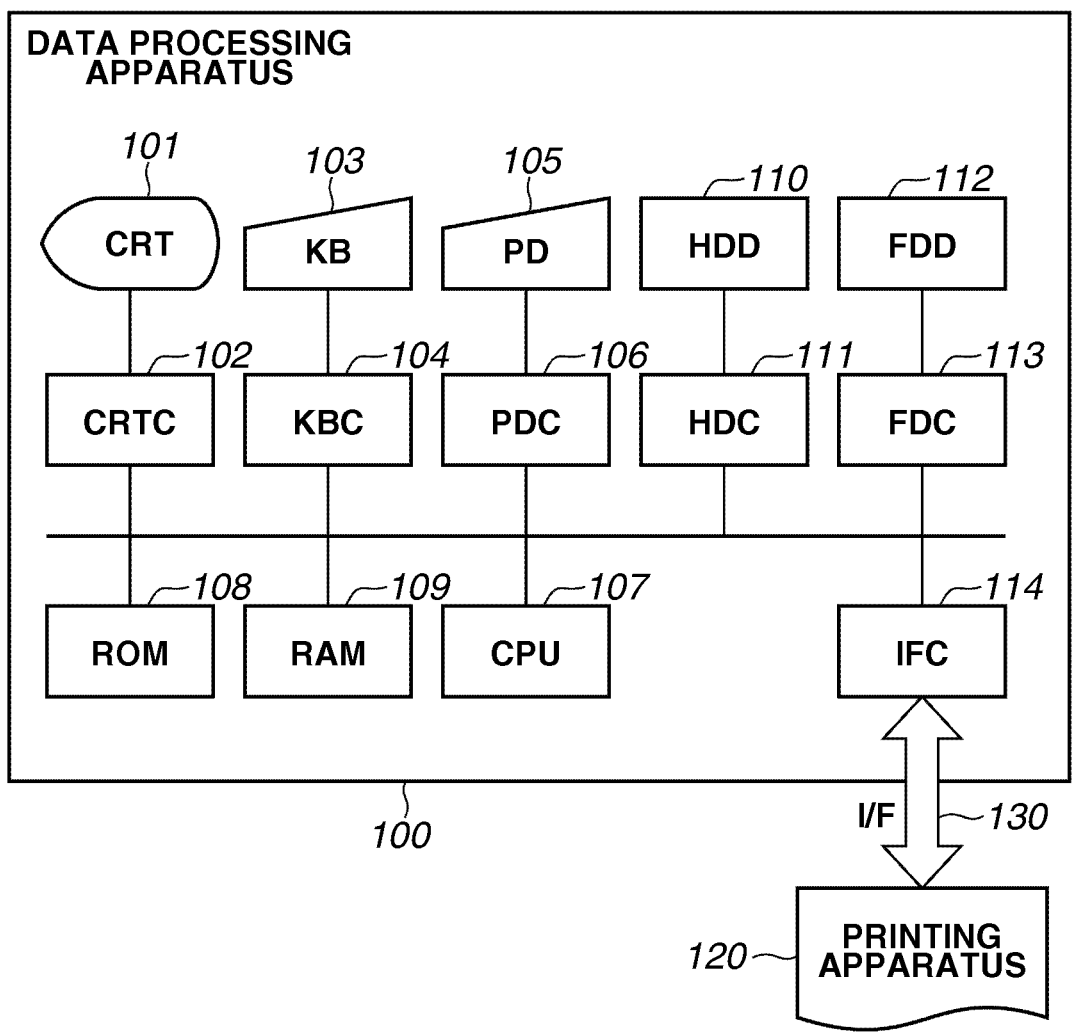
FIG. 1 is an example of a block diagram illustrating a configuration of a printing system.

While the processing of the layout filter 213 and the render filter 215 of the XPS printer driver of the present exemplary embodiment will be described in more detail later, for ease of understanding, flowcharts will be used. Each of the flowcharts used in the description is stored as a program in a hard disk apparatus 110 illustrated in FIG. 1. The stored program is read into a random access memory (RAM) 109, and executed by a central processing unit (CPU) 107. FIG. 1 is an example of a block diagram illustrating a configuration of a printing system in the present exemplary embodiment. FIG. 1 will be described in more detail later.

Figure 3A:
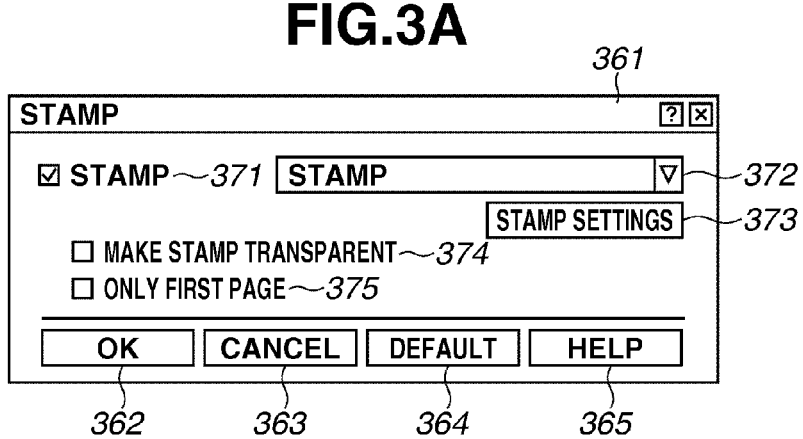
FIG. 3 is an example of a print dialog provided by a user interface module.
Figure 3B:
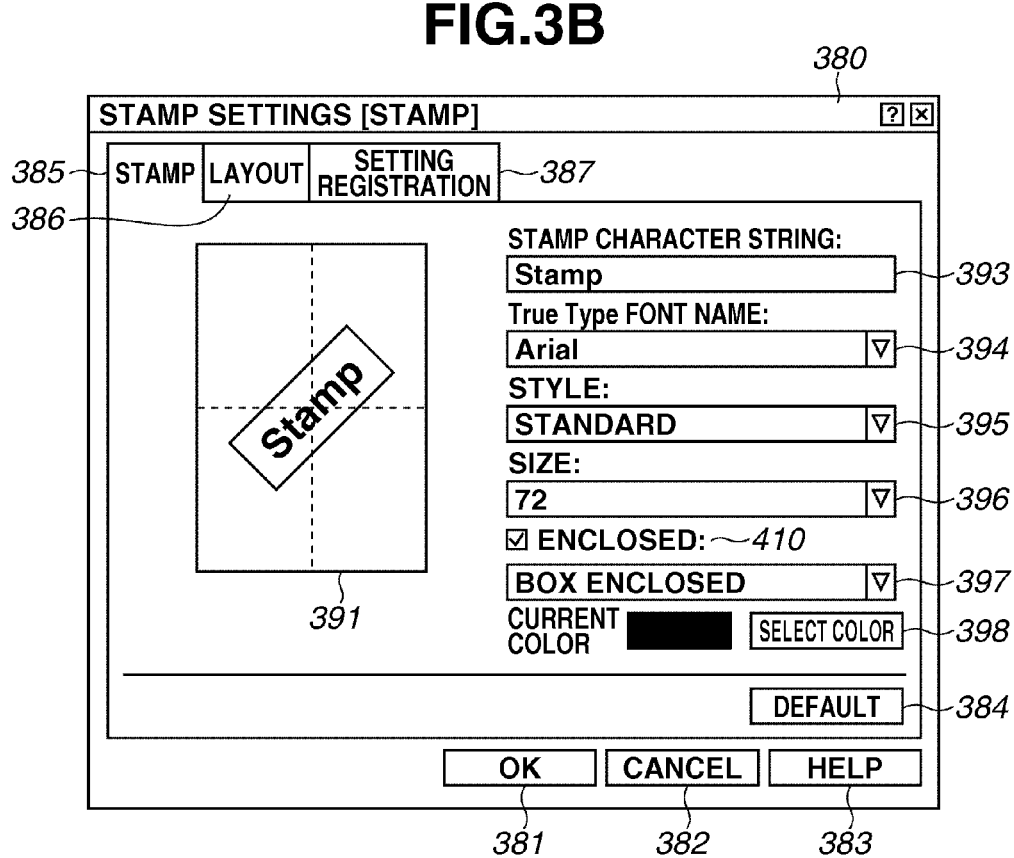
Figure 4A:
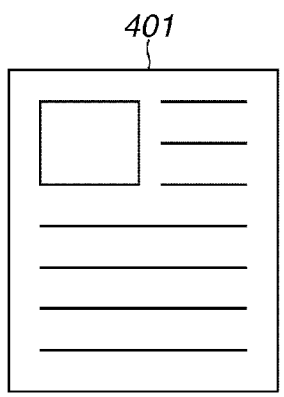
FIGS. 4A, 4B, and 4C are schematic diagrams illustrating stamp processing.
Figure 4B:
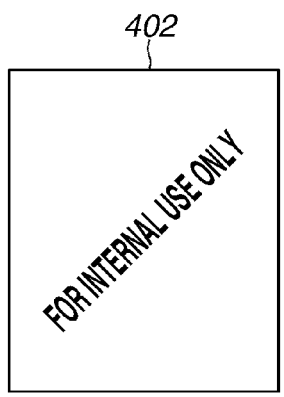
Figure 4C:
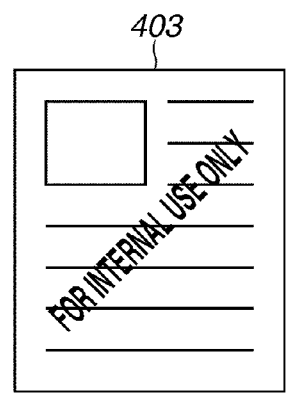
Figure 5:
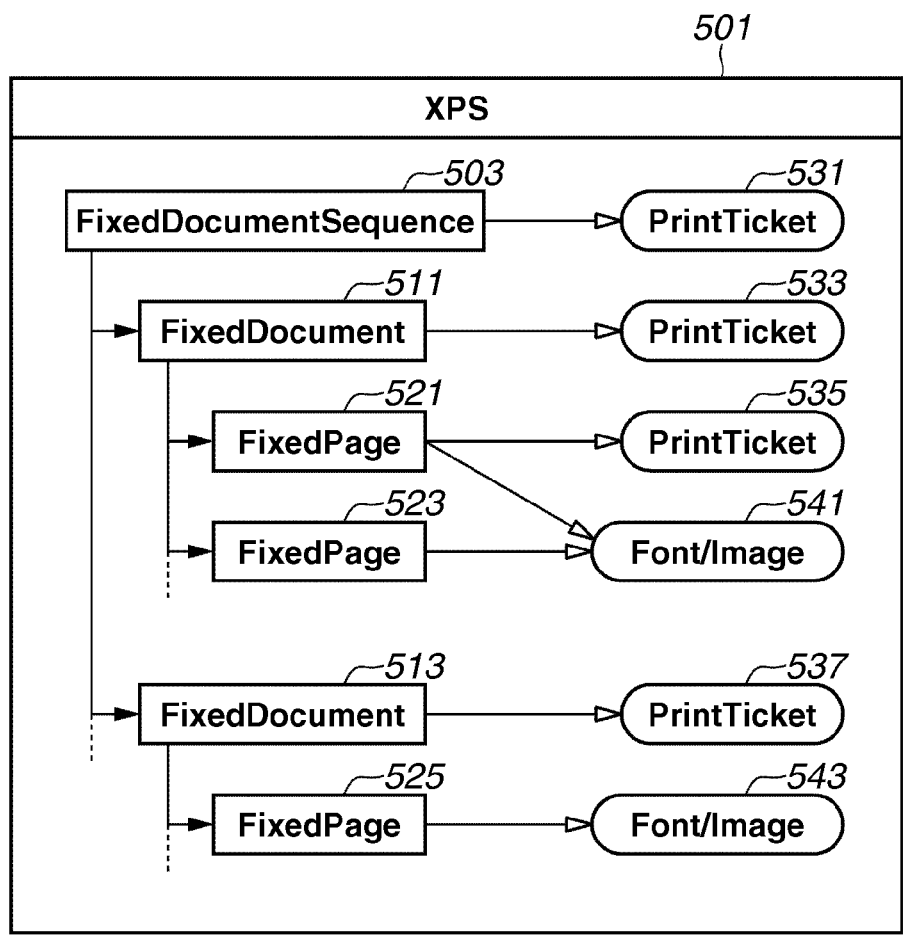
FIG. 5 is an example of a block diagram illustrating a logic structure of an XPS document.

Next, the print settings dialog provided by the user interface module 217 to the user will be described. FIGS. 3A and 3B are diagrams illustrating examples of the print settings dialogs displayed when the user performs the settings regarding the stamp in the present exemplary embodiment. These print settings dialogs display contents regarding the settings, and simultaneously also receive change instructions and inputs of the settings contents from the user.

FIG. 3A illustrates a display example of a stamp dialog. In the stamp dialog, the settings of the stamp to be superimposed on the pages of the print document can be performed. A stamp dialog 361 is configured of display areas 362 to 375. A stamp function can be enabled by setting a check box to ON in a stamp setting portion 371. A pre-registered stamp can be selected from a dropdown list in the stamp type setting portion 372. If a stamp setting portion 373 is pressed, a below-described stamp settings dialog of FIG. 3B opens, which allows the registered stamp settings to be changed, and a new stamp to be created and registered.

If a check box of a transparent stamp setting portion 374 is set to ON, the stamp characters become transparent, which makes it easier to confirm the contents of a document page which is laid out underneath the stamp characters. A heading stamp setting portion 375 can set whether to superimpose a pattern of the stamp on only a first page of the application document, or to superimpose the stamp on all pages.

After selecting the various settings, the user can close the stamp dialog 361 to reflect the selected print settings in the printing by pressing an OK button 362. If the user pushes a cancel button 363, the stamp dialog 361 closes, and the contents of the selected settings are discarded without being reflected in the printing. If the user pushes a default button 364, the setting values of the settings on the stamp dialog 361 are returned to their default state. However, this procedure does not have any effect on the setting values of the registered stamps. A help button 365 can display an explanation relating to the various settings of the stamp dialog 361 in a separate window.

FIG. 3B illustrates a display example of a stamp settings dialog. In the stamp settings dialog, the settings of the registered stamps can be changed and a new stamp can be created and registered. A stamp dialog 380 is configured of display areas 381 to 398. Since the number of items displayed in the stamp settings dialog of the present exemplary embodiment is very large, for ease of viewing, the contents of the settings are split up using tabbed sheets.

In a stamp tab 385, the contents concerning the settings for the character strings and bitmaps used in the stamps are displayed. In a layout tab 386, the position in the page on which a stamp is to be laid, the stamp rotation angle and the like are displayed. In a registration settings tab 387, the settings of a newly created stamp or of an existing stamp that was changed can be registered.

FIG. 3B illustrates a display example where, among the above-described tabs, the stamp tab 385 is selected. In a simple display area 391, information relating to the stamp of the currently set contents is displayed in a visual form An arbitrary character string to be used by the character stamp can be designated by a stamp character string input portion 393. Here, the word "Stamp" is input.

At a font name selection portion 394, the font to be used in rendering the stamp characters can be selected. As will be described later, since the size of the stamp characters can be changed, here a vector font represented by True Type can be selected. In addition to the illustrated Arial, the fonts which are installed in the OS operating the printer driver are listed. Here, attention has to be paid to the fact that there are fonts which are prohibited from being embedded into the electronic document due to the wishes of the font creator. As described above, when a font which is prohibited from being embedded is selected for the stamp in the present exemplary embodiment, since a bitmap rendering the character string is embedded in the electronic document, fonts which are prohibited from being embedded may also be selected.

A style selection portion 395 selects the style of the characters. In addition to the illustrated "Standard", italic, which slants the characters, and bold italic, which makes the characters bold and slanted, may be selected. The size of the stamp may be selected by a size setting potion 396. Whether a line enclosing the stamp characters is provided can be selected by a character enclosure setting portion 397. The character enclosure setting portion 397 appears when the checkbox of the enclosure setting portion 397 is set to ON, which allows a user to select a kind of line for enclosing the stamp characters. The illustrated box enclosure encloses the periphery of the stamp characters with a rectangular line, as illustrated by the simple display area 391. In addition to the box enclosure, a round enclosure which encloses the stamp characters with a circle, or a round box enclosure which encloses the stamp characters with a box having rounded corners can be selected. If a color selection portion 398 is pressed, a color settings dialog (not illustrated) opens, and the user can produce a desired color to be used in the stamp. If a default setting portion 384 is pressed, the settings of the stamp tab 385 return to those before being changed.

After selecting the various settings, the user can reflect the selected print settings in the printing by pressing an OK button 381 by closing the stamp settings dialog 380. If the user pushes the cancel button 382, the stamp settings dialog 380 closes, and the contents of the selected settings are discarded without being reflected in the printing. A help button 383 can display an explanation relating to the various settings of the stamp tab 385 in a separate window.

As described above, the user can perform the settings relating to the stamp via a print dialog provided by the user interface module 217 of the printer driver. Further, although not illustrated, in addition to the settings relating to the stamp, the user interface module 217 can also provide a print dialog which can be set by a user relating to print settings such as the kind of printing paper to be used, the size of the printing paper and the like.

Figure 6:
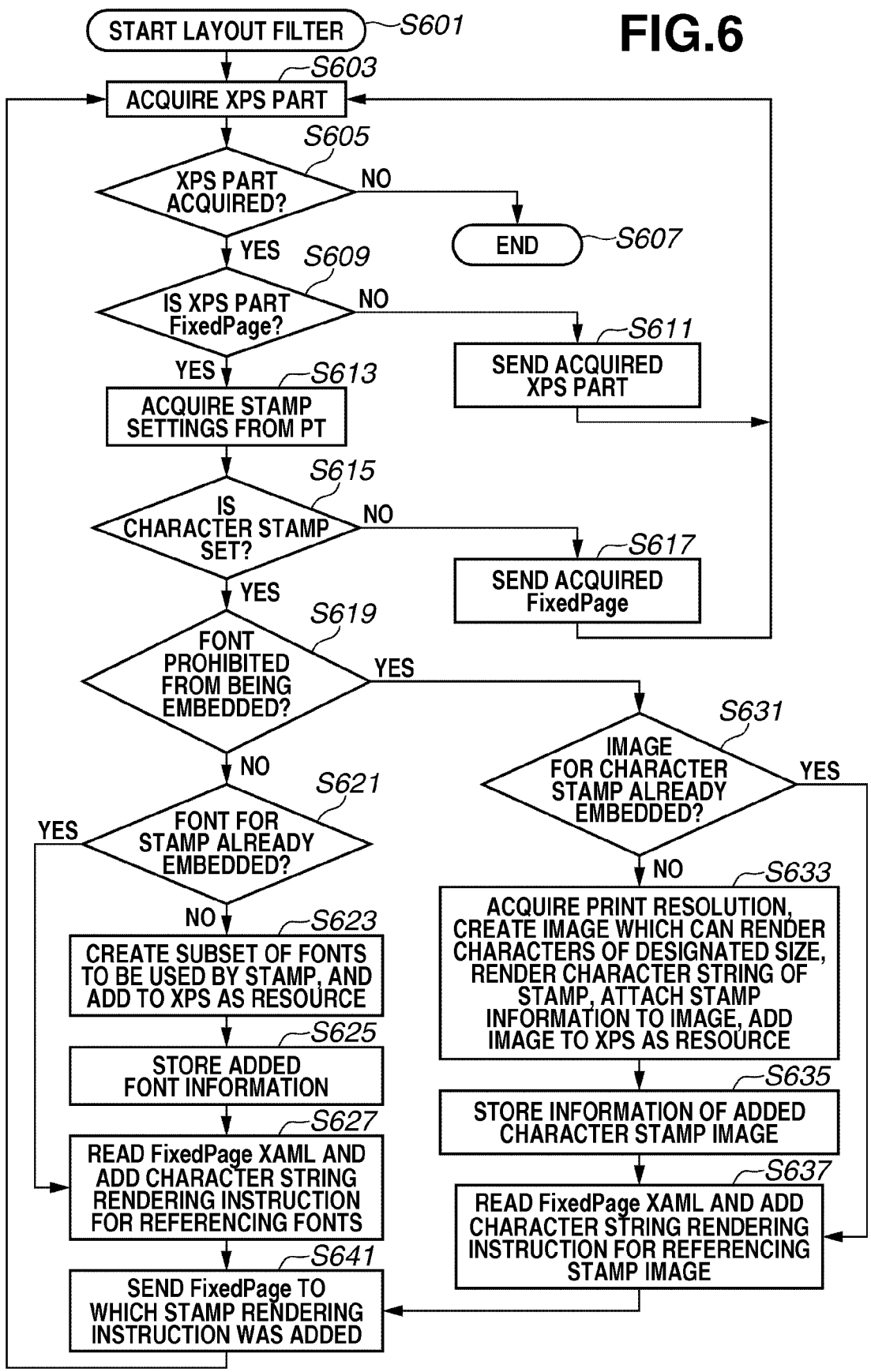
FIG. 6 is an example of a flowchart of embedding processing of stamp data of a layout filter according to a first exemplary embodiment.

Next, the embedding processing of the stamp information by the layout filter 213 will be described using FIG. 6. FIG. 6 is an example of a flowchart illustrating the embedding processing of the stamp information by the layout filter 213. As described above, the layout filter 213 of the OS is started up by the printing pipeline service 207 of the OS.

The processing starts in step S601, and in step S603, an XPS part is acquired. Then, in step S605, it is determined whether the XPS part is acquired. If the XPS part is acquired (YES in step S605), the processing proceeds to step S609. If the XPS part is not acquired (NO in step S605), this means that the XPS part was processed, so the processing proceeds to step S607 and is finished. In step S609, it is determined whether the acquired XPS part is an FP. If the acquired XPS part is an FP (YES in step S609), the processing proceeds to step S613. If the acquired XPS part is not an FP (NO in step S609), the processing proceeds to step S611. In step S611, the acquired XPS part is sent as is to the next filter, and then the processing returns to step S603. In step S613, the print setting relating to the stamp is acquired from the PT used by the FP.

Next, in step S615, it is determined whether the character stamp of the acquired print setting is set to ON. If the character stamp of the acquired print setting is set to ON (YES in step S615), the processing proceeds to step S619. If the character stamp of the acquired print setting is not set to ON (NO in step S615), the processing proceeds to step S617. In step S617, since there is no need to superimpose the stamp on the page, the acquired FP is sent as is to the next filter, and then the processing returns to step S603. In step S619, it is determined whether the font designated for the character stamp of the acquired print setting is prohibited from being embedded in an electronic document. If it is not prohibited from being embedded (NO in step S619), the processing proceeds to step S621. If it is prohibited from being embedded (YES in step S619), the processing proceeds to step S631.

Steps S621 to S627 perform the processing when a designated font is not prohibited from being embedded. In step S621, it is determined whether the font designated for the stamp has already been embedded in the XPS. If the font has already been embedded in the XPS (YES in step S621), the processing proceeds to step S627. If the font has not yet been embedded in the XPS (NO in step S621), the processing proceeds to step S623. In step S623, the characters to be used by the stamp are checked to create a subset of fonts, which is embedded in the XPS as a font resource. Next, in step S625, the information of the embedded font subset is stored so that the same font subset is prohibited in step S621 for being repeatedly embedded. Next, in step S627, the FP XAML is read, and a character string rendering command for referencing the fonts is added to the tail of the rendering command. Then, the processing proceeds to step S641.

Steps S631 to S637 perform the processing when a font which is prohibited from being embedded is designated. In such a case, since the font cannot be embedded into the XPS, a character stamp image rendering the character string of the stamp is created, and this image is embedded into the XPS. First, in step S631, it is determined whether the character stamp image determined from the print setting has already been embedded. If the image has already been embedded (YES in step S631), the processing proceeds to step S637. If the image has not yet been embedded (NO in step S631), the processing proceeds to step S633. In step S633, the image rendering the characters of the stamp is created, and the created image is embedded in the XPS as an image resource. Specifically, the resolution to be used when rendering the XPS in the render filter 215, and the size and character string of the stamp designated by the user are acquired from the PT, and the size of the image which is just sufficient to render at least the character string in the designated size is calculated. Then, a transparent image of the calculated size is created, and the character string of the stamp is rendered in the designated font, size, and color.

Figure 8:
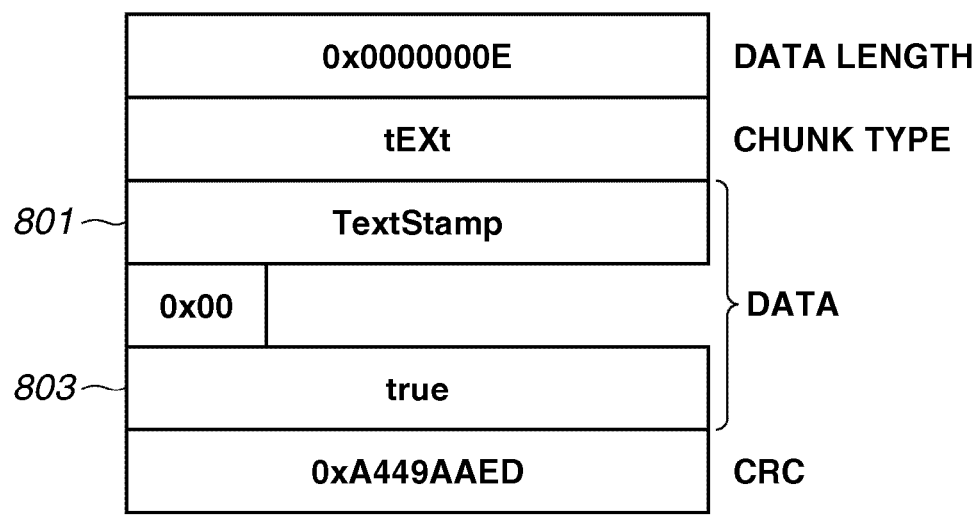
FIG. 8 is an example of a character stamp ancillary chunk stored in a Portable Network Graphic (PNG).

Further, information meaning that the characters of the stamp were rendered is attached to this character stamp image. For example, if a PNG is used for the format of the character stamp image, the ancillary chunk illustrated in FIG. 8 may be attached. For example, by setting a text data keyword 801 as "Text Stamp", and a text value 803 thereof as "true", information meaning that the stamp characters were rendered in the PNG can be attached. In addition, to express the color designated by the user, a color profile which defines the color space may be attached to the character stamp image. If the color profile is added to the character stamp image, the color designated by the user can be expressed even if the profile is designated in the FP.

In step S635, the information of the embedded character stamp image is stored so that the same character stamp image as in step S631 is not repeatedly embedded. Next, in step S637, the FP XAML is read, and an image rendering command for referencing the embedded character stamp image is added to the tail of the rendering command. Then, the processing proceeds to step S641.

In step S641, the FP whose XAML was edited in step S627 or step S637 is sent to the next filter, and the processing returns to step S603.

Thus, when an embeddable font is designated by the user, the font is embedded by the layout filter 213 in the XPS, and when a font which is prohibited from being embedded is designated by the user, a character stamp image rendering the characters is embedded by the layout filter 213 in the XPS. When creating the character stamp image, in consideration of the rendering resolution, enlargement or reduction processing is not performed during the rendering, and the quality of the stamp characters can be maintained. Further, by processing in the above manner, all of the resources required when rendering the XPS can be embedded.

Further, although in the present exemplary embodiment, the character stamp image is embedded only in cases where a font which is prohibited from being embedded into the electronic document is designated. However, the character stamp image may also be embedded with respect to fonts which are allowed to be embedded.

Figure 7:
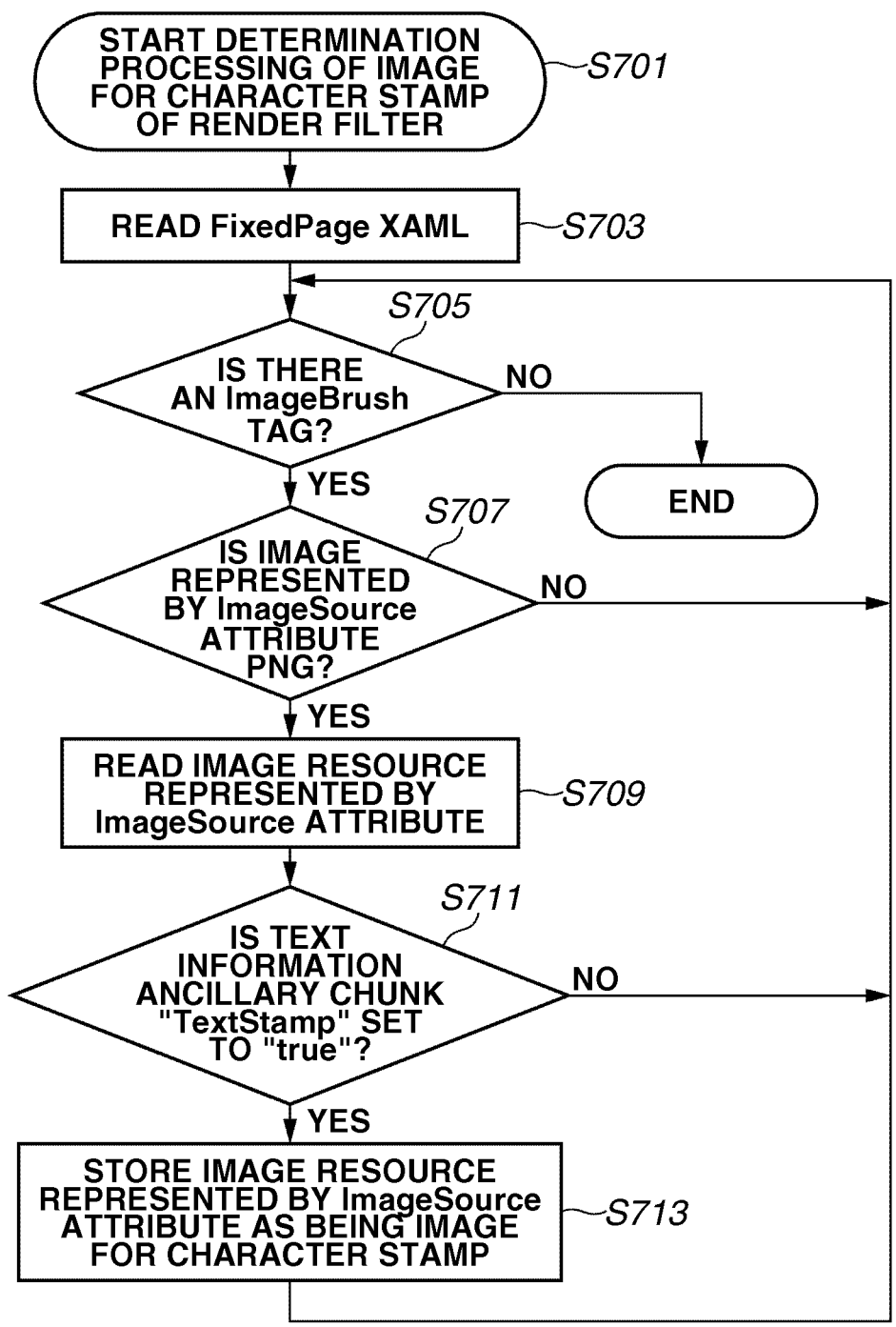
FIG. 7 is an example of a flowchart of determination processing of a character stamp image of a layout filter according to the first exemplary embodiment.

Next, the determination processing of the character stamp image by the render filter 215 will be described using FIG. 7. FIG. 7 is an example of a flowchart of the processing performed by the render filter 215, which determines, when rendering the supplied XPS, whether an image referenced in the FP is a character stamp image embedded by the layout filter 213.

The processing starts in step S701. In step S703, the FP XAML is acquired. Next, steps S705 to S713 are a loop for verifying all of the Image Brush tags written in the XAML. In step S705, it is determined whether there is an Image Brush tag. If there is no Image Brush tag (NO in step S705), the processing is finished. If there is an Image Brush tag (YES in step S705), the processing proceeds to step S707. In step S707, it is determined whether the image represented by an Image Source attribute of the Image Brush tag is a PNG. If the image is not a PNG (NO in step S707), the processing returns to step S705, and if the image is a PNG (YES in step S707), the processing proceeds to step S709. In step S709, a path of the resource represented by the Image Source attribute of the Image Brush tag is acquired, and the image resource stored in the XPS is read.

Next, the processing proceeds to step S711. In step S711, it is determined whether an ancillary chunk of text information is present in the read PNG chunk, whether a keyword is "Text Stamp", and whether the text value is set to "true". As described above using FIG. 8, this ancillary chunk is information which the layout filter 213 attached to the PNG, which represents whether the image is a character stamp image. In step S711, if an ancillary chunk of text information is present in the read PNG chunk (YES in step S711), the processing proceeds to step S713, and if an ancillary chunk is not present (NO in step S711), the processing returns to step S705. In step S713, the fact that the image resource represented by the Image Source attribute of the Image Brush tag is a character stamp image is stored, and the processing returns to step S705.

By processing in this manner, the render filter 215 can determine whether the image resource to be used by each page of the supplied XPS is a character stamp image. This allows the render filter 215 to perform image processing for characters on the character region of the stamp after rendering the XPS page. Therefore, even though the stamp characters are supplied as an image, since suitable processing is performed on the character region of the stamp, the same quality as that of the non-stamp characters can be maintained.

Figure 12:
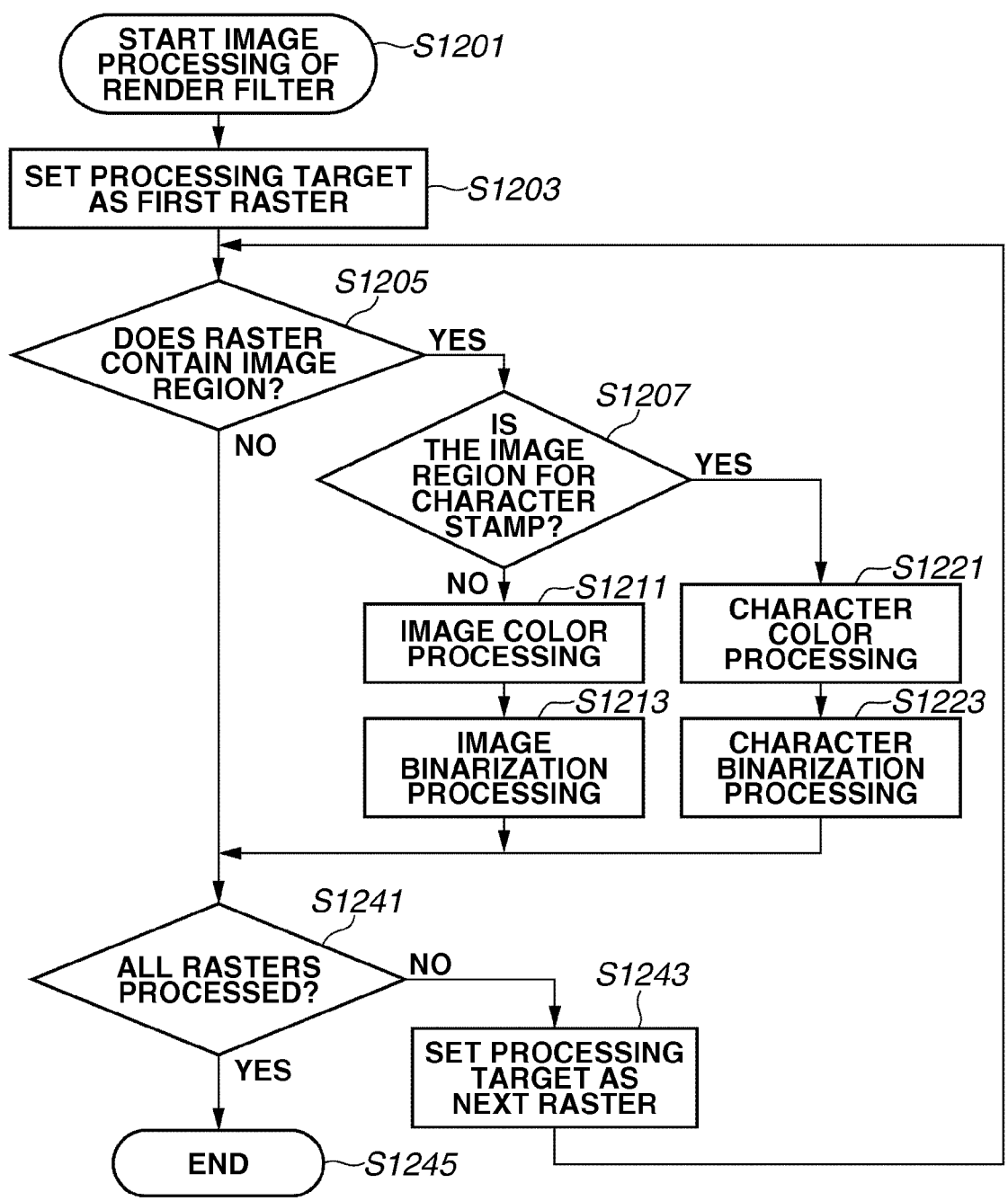
FIG. 12 is an example of a flowchart relating to image processing of a render filter.

Next, the image processing performed by the render filter 215 will be described using FIG. 12. FIG. 12 is an example of a flowchart of the image processing which the render filter 215 performs after rendering the FP of the supplied XPS.

Before performing the processing of FIG. 12, the render filter 215 renders the FP bitmap data from the supplied XPS. At that stage, when rendering a character code, a character attribute flag is stored in a corresponding attribute plane region. Similarly, when an image is rendered, an image attribute flag is stored in a corresponding attribute plane region. Concerning the image resource of the character stamp, since it is an image, normally the image attribute flag would be stored in the region corresponding to the image attribute plane. However, in the present specification, the character attribute flag is stored in the corresponding attribute plane region. Further, as another processing, while the character attribute flag is stored in a portion of the character pattern, the processing can also be performed such that in the background portions of the characters, the character attribute flag is not stored (the original attribute remains as is).

Next, the processing of FIG. 12 will be described.

First, the processing starts in step S1201. In step S1203, the first raster based on the rendering results is set as the processing target. Next, in step S1205, it is determined whether the processing target raster includes an image region. If the processing target raster does not include an image region (NO in step S1205), the processing proceeds to step S1241. If the processing target raster does include an image region (YES in step S1205), the processing proceeds to step S1207.

In step S1207, it is determined by the attribute flag of the attribute plane whether the image region included in the raster is a character region or a character stamp image region. If it is determined that the image region is not a character stamp image region (NO in step S1207), the processing proceeds to step S1211, and if it is determined that the image region is a character stamp image region (YES in step S1207), the processing proceeds to step S1221. Here, the term "image region" in the character stamp image refers to the region in which characters are rendered in the character stamp image.

Steps S1211 and S1213 perform processing for images, such as a photograph, for example. In step S1211, image color processing is performed. Here, for example, color conversion processing can be performed in which results are obtained that are visually desirable for a photograph. In the following step S1213, image binarization processing is performed. Here, binarization processing can be performed which emphasizes gradation over sharpness by an error diffusion method, for example. Then, the processing proceeds to step S1241.

Steps S1221 and S1223 perform processing for character stamp images. In step S1221, character color processing is performed. Here, color conversion processing can be performed in which results are obtained that are visually desirable for characters, such as by giving priority to maintaining color saturation. In the following step S1223, character binarization processing is performed. Here, binarization processing can be performed which emphasizes sharpness over gradation by a dither method, for example. Then, the processing proceeds to step S1241.

In step S1241, it is determined whether all of the rasters included in the rendering results have been processed. If all of the rasters have been processed (YES in step S1241), the processing proceeds to step S1245 and is finished, while if there is still an unprocessed raster (NO in step S1241), the processing proceeds to step S1243. In step S1243, the raster of the processing target is set as the next raster, and the processing returns to step S1205 to be continued.

Thus, the render filter 215 can perform the processing for characters on the image region of the character stamp image when performing the image processing of the FP rendering results. These rendering results may be for the whole FP, or for a band region formed by dividing the FP into rectangular regions.

Next, the printing system in the present exemplary embodiment will be described using FIG. 1. FIG. 1 is an example of a block diagram illustrating the configuration of the printing system in the present exemplary embodiment. Broadly defined, the printing system in the present exemplary embodiment is configured of a printing apparatus 120 and a data processing apparatus (computer) 100, and the data processing apparatus 100 is configured of the blocks 101 to 114.

The data processing apparatus 100 includes a cathode ray tube (CRT) display device 101, which displays a print setting dialog and the like provided by the user interface module of the printer driver. Further, the data processing apparatus 100 includes a CRT controller (CRTC) 102, which is a controller for the display apparatus, a data input device 103 such as a keyboard, a keyboard controller 104, a coordinate input device 105 such as a pointing device, and a pointing device controller 106.

The data processing apparatus 100 also includes a CPU 107 responsible for controlling the entire apparatus, a read only memory (ROM) 108 for storing a boot program and the like, and a RAM 109 which stores the OS, various application programs, and the printer driver programs relating to the flowcharts of the present exemplary embodiment, and which is also utilized as a work area.

Further, the data processing apparatus 100 includes a hard disk device 110 for storing the OS, various application programs, printer driver programs including the programs relating to the flowcharts described in the present specification, font data, and data files. Furthermore, the data processing apparatus 100 includes a hard disk controller 111, a Floppy® disk device 112 which is a drive device of a portable storage medium, and a Floppy® disk controller 113. The hard disk device 110 also temporarily stores a spool file.

Between the data processing apparatus 100 and the printing apparatus 120, an interface 130 is provided. The data processing apparatus 100 also includes an interface controller 114. The data processing apparatus 100 is connected to the printing apparatus 120, such as an inkjet printer, via an interface cable. A bus is provided to connect the various devices.

When power is applied to the present apparatus, the CPU 107 starts up based on the boot program stored in the ROM 108, and the OS is loaded from the hard disk device 110, whereby the present apparatus is in a standby state waiting for operation by an operator. Further, when a printing instruction is received via the application, the printer driver program stored in the hard disk device 110 is loaded into the RAM 109 and executed by the CPU 107. The printer driver program is also loaded into the RAM 109 and executed by the CPU 107 when, instead of a printing instruction, a print setting change instruction of the printer driver is set or when the apparatus is set to automatically start up.

Thus, when a font which is prohibited from being embedded into the electronic document is designated for the stamp font by the user, the layout filter 213 embeds into the XPS a character stamp image which renders the characters of the stamp. Since this character stamp image is created based on the resolution when the render filter 215 renders the XPS, enlargement or reduction processing is not performed during the rendering, and quality does not deteriorate even in the printing results. Further, since all of the resources required for the rendering are included in the electronic document output by the layout filter 213, there is no need to perform special processing, such as reading an external font, in the render filter 215. Further, since the information to be used by the character stamp is included in the character stamp image embedded into the electronic document, the render filter 215 can apply character color conversion processing, binarization processing and the like on the character stamp image. Therefore, since image processing for graphics and photographs is not applied on the character stamp image, the quality as characters can be maintained despite the fact that the characters are stored in the electronic document as an image.

In the above-described first exemplary embodiment, the layout filter 213 attaches information meaning that the characters of the stamp are rendered to a character stamp image, and embeds this character stamp image into the XPS. Further, the render filter 215 determines whether character stamp information is attached to the image to be used by the FP in order to determine whether the image is a character stamp image. Namely, the render filter 215 has to acquire all of the images to be used by the FP, and examine the acquired contents. Therefore, in a second exemplary embodiment, the render filter 215 is configured so that it can determine whether the image is a character stamp image without having to examine the contents of all the images.

Since the configuration of the printing system and the print setting dialog provided by the user interface module 217 in the present exemplary embodiment is the same as in the first exemplary embodiment, a description thereof is omitted.

Further, since the configuration of the printer driver in the present exemplary embodiment is the same as in the first exemplary embodiment, a description thereof is omitted. Moreover, since the operation of the printer driver is also the same in many aspects, to clarify the characteristics of the present exemplary embodiment, only the differences will be described.

The layout filter 213 reads the PT from the spool file 205, and checks whether a print setting stamp is set to ON. If the stamp is set to ON and a font prohibited from being embedded is designated, the layout filter 213 generates an image which renders the characters of the stamp, and embeds the created image in the XPS. Further, a command for rendering the embedded character stamp image is added to the tail of the rendering command of the FP XAML, and the resulting rendering command is output. At this stage, information that the image is a character stamp image is added to the command for rendering the embedded character stamp image. The processing of the layout filter 213 in the present exemplary embodiment will be described in more detail later using FIG. 9.

If a command for rendering the image is present in the read FP XAML, the render filter 215 determines whether there is information that the image is a character stamp image, and determines whether the image referenced by the rendering command is a character stamp image. The determination processing of the character stamp image performed by the render filter 215 in the present exemplary embodiment will be described in more detail later using FIG. 10.

While the processing of the layout filter 213 and the render filter 215 of the XPS printer driver of the present exemplary embodiment will be described in more detail later, for ease of understanding, flowcharts will be used. Further, each of the flowcharts used in the description is stored as a program in the hard disk apparatus 110, read in the RAM 109, and executed by the CPU 107.

Figure 9:
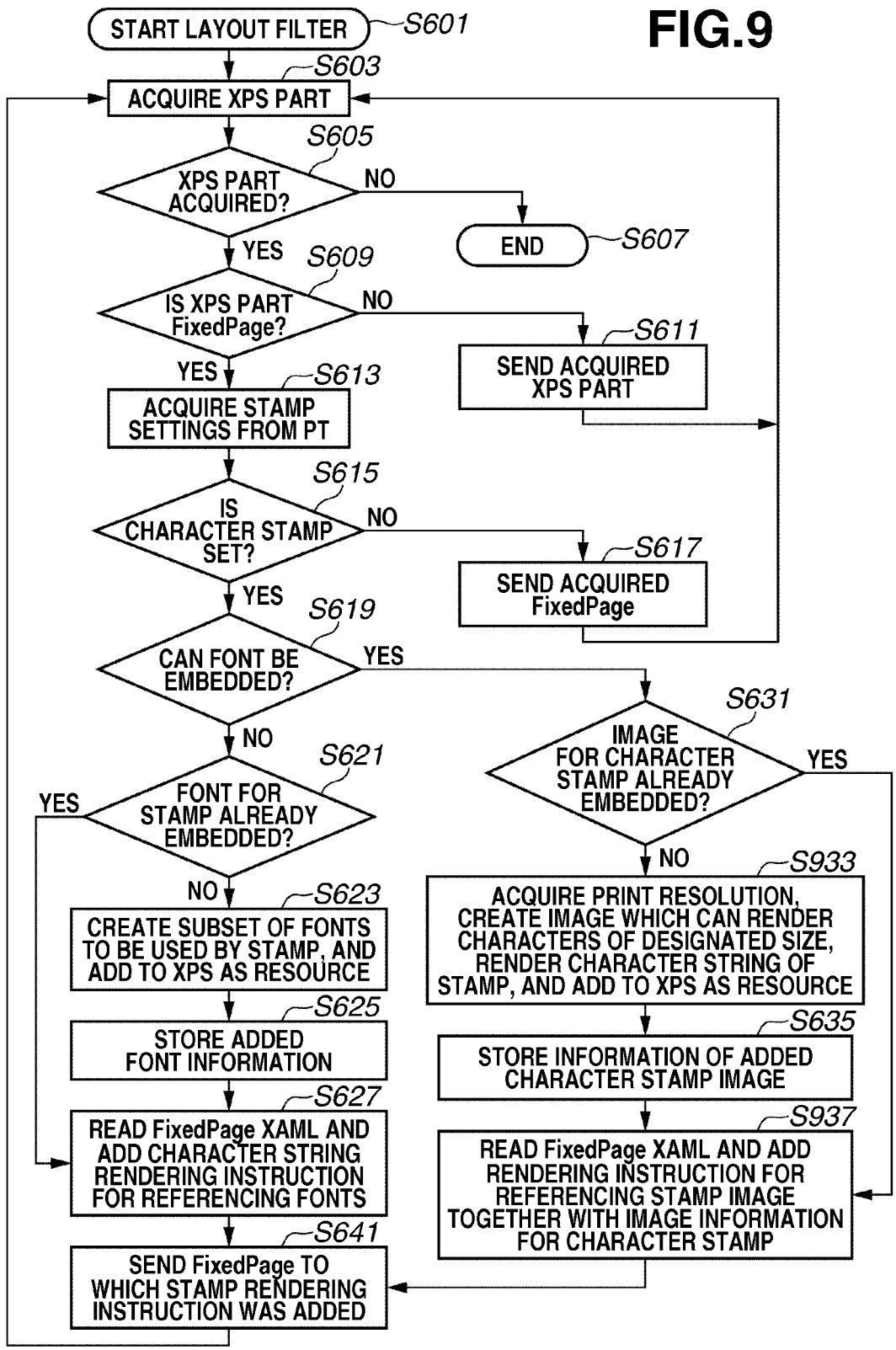
FIG. 9 is an example of a flowchart of embedding processing of stamp data of a layout filter according to a second exemplary embodiment.

Next, the embedding processing of the stamp data of the layout filter 213 will be described using FIG. 9. FIG. 9 is an example of a flowchart illustrating the embedding processing of the stamp data of the layout filter 213. Much of the processing of FIG. 9 is the same as that in FIG. 6, with only the steps S933 and S937 being different. Thus, only the processing relating to steps S631 to S937 will be described.

Steps S631 to S937 perform the processing when a font which is prohibited from being embedded is designated for the stamp. In such a case, since the font cannot be embedded into the XPS, a character stamp image rendering the character string of the stamp is created, and this image is embedded into the XPS. First, in step S631, it is determined whether the character stamp image determined from the print setting has already been embedded. If the image has already been embedded (YES in step S631), the processing proceeds to step S937. If the image has not yet been embedded (NO in step S631), the processing proceeds to step S933. In step S933, the image rendering the characters of the stamp is created, and the created image is embedded in the XPS as an image resource. Specifically, the resolution to be used when rendering the XPS in the render filter 215, and the size and character string of the stamp designated by the user are acquired from the PT, and the size of the image which is just sufficient to render at least the character string in the designated size is calculated. Then, a transparent image of the calculated size is created, and the character string of the stamp is rendered in the designated font, size, and color.

In step S635, the information of the embedded character stamp image is stored so that the same character stamp image as in step S631 is not repeatedly embedded. Next, in step S937, the FP XAML is read, and an image rendering command for referencing the character stamp image is added to the tail of the various rendering commands. Then, the processing proceeds to step S641. Here, information representing that the referenced image is a character stamp image is attached to the image rendering command for referencing the character stamp image. For example, the character stamp information 1103 illustrated in FIG. 11A and the character stamp information 1107 illustrated in FIG. 11B may be added to the Image Brush tag of the XAML. Further, for example, the name of the attribute may be set to "Text Stamp", and its value to "true".

By processing in this manner, the layout filter 213 can add information that the image in the XAML is a character stamp image. Here, the acquired XAML rendering command 1101 (rendering data of the first page of the document) and rendering command 1105 (rendering data of the second page of the document) are omitted as comments.

Figure 10:
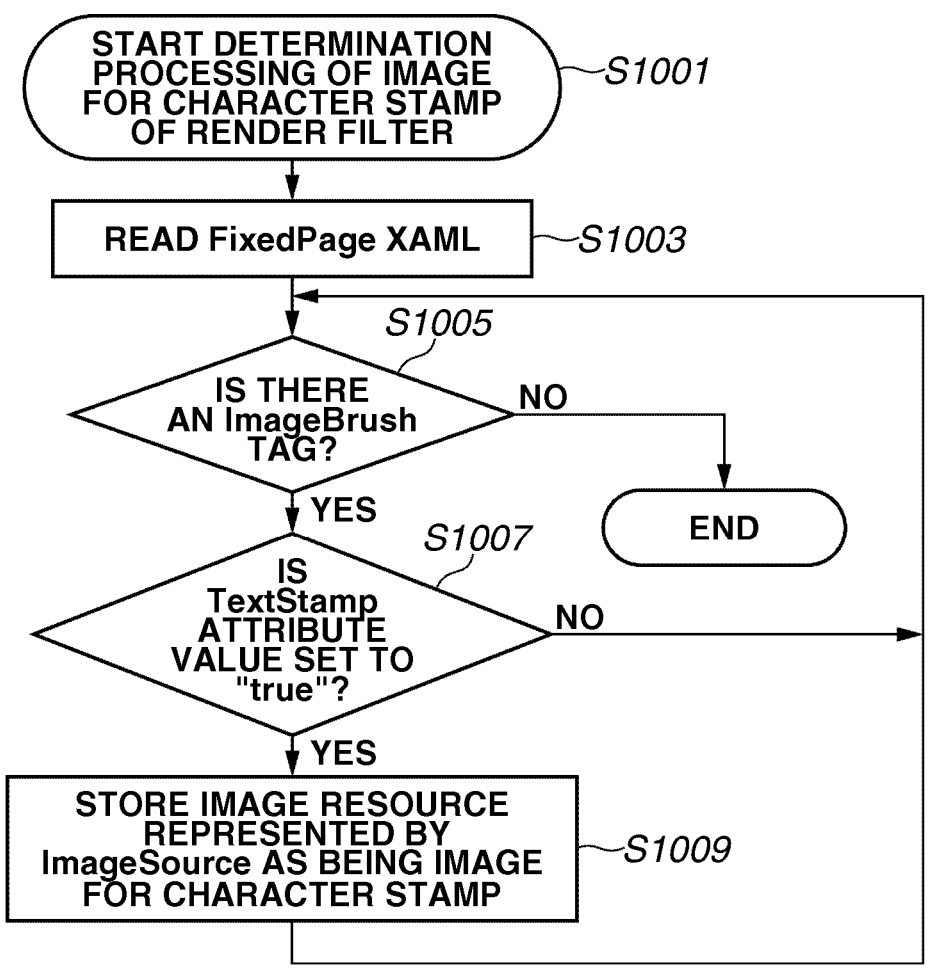
FIG. 10 is an example of a flowchart of determination processing of a character stamp image of the layout filter according to the second exemplary embodiment.

Next, the determination processing of the character stamp image performed by the render filter 215 will be described using FIG. 10. FIG. 10 is an example of a flowchart of the processing performed by the render filter 215 to determine, when rendering the supplied XPS, whether an image referenced in the FP is a character stamp image embedded by the layout filter 213.

The processing starts in step S1001. In step S1003, the FP XAML is acquired. Next, steps S1005 to S1013 are a loop for verifying all of the Image Brush tags written in the XAML. In step S1005, it is determined whether there is an Image Brush tag. If there is no Image Brush tag (NO in step S1005), the processing ends. If there is an Image Brush tag (YES in step S1005), the processing proceeds to step S1007. In step S1007, it is determined whether the value of the Text Stamp attribute of the Image Brush tag is "true". If the value is not "true" (NO in step S1007), the processing returns to step S1005, and if the value is "true" (YES in step S1007), the processing proceeds to step S1009. In step S1009, the fact that the image resource represented by the Image Source attribute of the Image Brush tag is a character stamp image is stored, and the processing returns to step S1005.

By processing in this manner, the render filter 215 can determine whether the image resource referenced by each FP of the supplied XPS is a character stamp image.

The exemplary embodiments of the present invention have the following advantageous effects. First, since an image which renders the character string of the stamp is embedded in the print data, the user can designate the font of the stamp even if that font is prohibited from being embedded in the electronic document.

Next, by embedding the image rendering the character string of the stamp in the print data, it is no longer necessary to perform special processing, such as reading an external font. Further, by referencing during rendering the communication information attached to the print data, suitable image processing can be performed on the character region of the stamp which is embedded as an image. Further, since the size of the image rendering the character string of the stamp is determined based on the size of the characters of the stamp designated by the print conditions, and the resolution during the rendering determined by the print conditions, enlargement or reduction processing is not performed, and quality does not deteriorate even in the printing results.

Further, the render filter 215 can determine whether the image is a character stamp image without having to examine the contents of all the images referenced by each FP XAML.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-125879 filed May 13, 2008, which is hereby incorporated by reference herein in its entirety.

What is claimed is:

1. An information processing apparatus comprising:
    an image processing unit configured to perform processing on data included in an electronic document data;
    a determination unit configured to determine whether a designated font is prohibited from being embedded; and
    an embedding unit configured to, when it is determined by the determination unit that the designated font is not a font which is prohibited from being embedded, embed the designated font as a font resource in document data, and when it is determined by the determination unit that the designated font is a font which is prohibited from being embedded, create an image based on the designated font and embed the created image into the document data,
    wherein the embedding unit creates a subset of the designated font and embeds the subset of the designated font to the document data in a case where the determination unit determines that the designated font is not a font which is prohibited from being embedded.

2. The information processing apparatus according to claim 1, wherein the designated font includes a font designated by a stamp character string.

3. The information processing apparatus according to claim 1, further comprising: a generation unit configured to generate bitmap data based on the document data; and a transmission unit configured to transmit the bitmap data generated by the generation unit to a printer, wherein the image processing unit is configured to perform image processing on the bitmap data generated by the generation unit.

4. The information processing apparatus according to claim 1, further comprising: said image processing unit configured to perform processing for characters on an image resource containing information representing that the image is a character, and perform processing for images on an image resource not containing the information representing that the image is a character, wherein the processing for images includes color processing or binarization processing.

5. The information processing apparatus according to claim 1, further comprising: an embedding determination unit configured to determine whether the designated font is embedded to the document data, in a case where the determination unit determines that the designated font is not a font which is prohibited from being embedded, wherein the embedding unit adds a command to the document data to reference font resources in the document data, in a case where the embedding determination unit determines that the designated font is embedded to the document data.

6. An information processing method comprising:
    an image processing unit configured to perform processing on data included in an electronic document data;
    determining whether a designated font is prohibited from being embedded;
    embedding, when the designated font is not a font which is prohibited from being embedded, the designated font as a font resource in document data, and when the designated font is a font which is prohibited from being embedded, creating an image based on the designated font and embed the created image into the document data,
    wherein the embedding creates a subset of the designated font and embeds the subset of the designated font to the document data in a case where it is determined that the designated font is not a font which is prohibited from being embedded.

7. The information processing method according to claim 6, wherein the designated font includes a font designated by a stamp character string.

8. The information processing method according to claim 6, further comprising: generating bitmap data based on the document data; and transmitting the generated bitmap data to a printer, wherein image processing is performed on the generated bitmap data.

9. The information processing method according to claim 6, further comprising: performing processing for characters on an image resource containing information representing that the image is a character, and perform processing for images on an image resource not containing the information representing that the image is a character, wherein the processing for images includes color processing or binarization processing.

10. The information processing method according to claim 6, further comprising: determining whether the designated font is embedded to the document data, in a case where it is determined that the designated font is not a font which is prohibited from being embedded, wherein the embedding adds a command to the document data to reference font resources in the document data, in a case where it is determined that the designated font is embedded to the document data.

11. A non-transitory storage medium storing a program for causing a computer to perform operations comprising:
    determining whether a designated font is prohibited from being embedded;
    embedding, when the designated font is not a font which is prohibited from being embedded, the designated font as a font resource in document data, and when the designated font is a font which is prohibited from being embedded, creating an image based on the designated font and embed the created image into the document data,
    wherein the embedding creates a subset of the designated font and embeds the subset of the designated font to the document data in a case where it is determined that the designated font is not a font which is prohibited from being embedded.

12. The non-transitory storage storing a program according to claim 11, wherein the designated font includes a font designated by a stamp character string.

13. The non-transitory storage storing a program according to claim 11, further comprising: generating bitmap data based on the document data; and transmitting the generated bitmap data to a printer, wherein image processing is performed on the generated bitmap data.

14. The non-transitory storage storing a program according to claim 11, further comprising: performing processing for characters on an image resource containing information representing that the image is a character, and perform processing for images on an image resource not containing the information representing that the image is a character, wherein the processing for images includes color processing or binarization processing.

* * * * *